United States Patent [19]

Coutsomitros

[11] Patent Number: 5,646,728
[45] Date of Patent: Jul. 8, 1997

[54] ULTRASENSITIVE INTERFEROMETER SUITABLE FOR DETECTING GRAVITATIONAL WAVES

[75] Inventor: Constantin Coutsomitros, Ranco, Italy

[73] Assignee: European Economic Community (EEC), Luxembourg, Luxembourg

[21] Appl. No.: 495,605

[22] PCT Filed: Jan. 10, 1994

[86] PCT No.: PCT/EP94/00050

§ 371 Date: Jul. 17, 1995

§ 102(e) Date: Jul. 17, 1995

[87] PCT Pub. No.: WO94/16296

PCT Pub. Date: Jul. 21, 1994

[30] Foreign Application Priority Data

Jan. 15, 1993 [LU] Luxembourg ............... 88211

[51] Int. Cl.$^6$ ........................................ G01B 9/02
[52] U.S. Cl. .................... 356/352; 356/348; 356/357
[58] Field of Search ........................... 356/347, 348, 356/352, 357, 35.5; 73/656; 359/15

[56] References Cited

U.S. PATENT DOCUMENTS 3,744,909  7/1973  Bruce ....................... 356/345
4,188,096  2/1980  Shajenko .

OTHER PUBLICATIONS

Journal of Physics E. Scientific Insstruments, vol. 12, No. 11, Nov. 1979, Bristol, GB, pp. 1043–1050, Billing et al. 'AN Argon Laser Interferometer for the Detection of Gravitational Radiation'.

Primary Examiner—Samuel A. Turner
Attorney, Agent, or Firm—Darby & Darby

[57] ABSTRACT

A very low amplitude interferometer suitable for detecting gravitational waves is disclosed. The interferometer has an optical cavity consisting of a glass plate sandwiched between two three-dimensional interferometric arrays and contacting a body in which micro-vibration is to be sensed. The interface between the interferometric arrays and the glass plate entraps thin layers of air. A coherent light source is used to illuminate one of the interferometric arrays. Micro-vibrations transmitted through the glass plate will affect the air layers sufficiently to render these vibrations detectable through interference patterns created by the reflected coherent light on a display screen.

5 Claims, 2 Drawing Sheets

ULTRASENSITIVE INTERFEROMETER SUITABLE FOR DETECTING GRAVITATIONAL WAVES

The invention relates to a device for detecting micro-vibrations of very small amplitude, which is susceptible, due to its extraordinary sensitiveness, to detect vibrations of an amplitude of $10^{-20}$ m and less.

The theory of general relativity provides that gravity propagates in waves caused by enormous moving masses. If a gravitational wave arrives on earth, it causes changes in the geometry of each object, such as dilatation in one direction and contraction in another direction. The theoretical estimation of these changes in size situates them in the order of magnitude of $10^{-20}$ m and less. The best vibration measurement instruments which are nowadays available are optical interferometers or systems of cryogenic transducers which are able to detect displacements up to $10^{-18}$ m, which is insufficient for the measurements mentioned above. An american project named LIGO (Laser Interferometer for Gravitational Waves Observatory) is known, which uses a Michelson interferometer, each branch of which has a length of 6 km. This project will probably be in working condition by 1998, and a resolution of $10^{-21}$ m is prognosticated.

It is the aim of the present invention to supply a device for detecting micro-vibrations which is notably less bulky than the LIGO project and less expensive, and which is equally capable to detect micro-movements of an amplitude of $10^{-20}$ and even less.

According to the invention, this aim is achieved by the fact that the device comprises an optical cavity composed of a glass plate disposed between two three-dimensional interferometric networks, said plate being in contact with a body the micro-vibrations of which are to be detected, and the two interferometric networks resting by gravity on supports which are integral with said body, a source of coherent light illuminating a first one of said two networks of said optical cavity, and a display screen receiving the light reflected from this optical cavity.

Characteristics of a preferred embodiment of the invention are referred to in the secondary claims.

The invention will now be described in more detail by means of an embodiment and of four figures, which relate to a laboratory size realisation.

Figure 1:
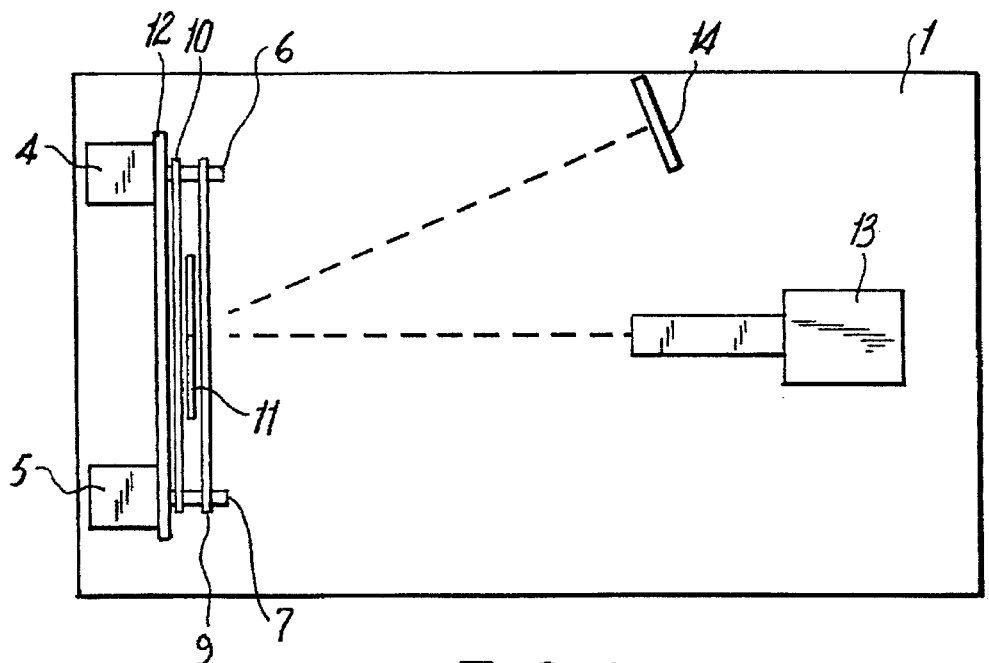
FIG. 1 shows from above an optical table on which the device according to the invention is mounted.
Figure 2:
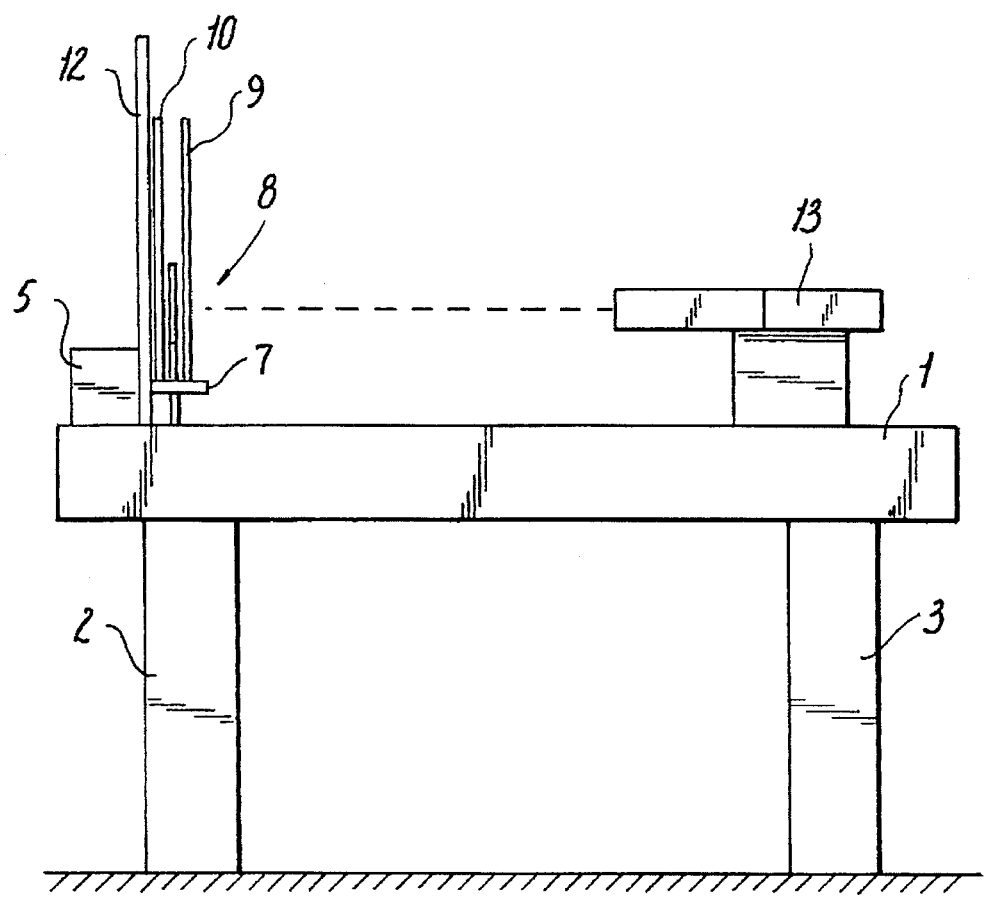
FIG. 2 shows the same device seen from the side.
Figure 3:
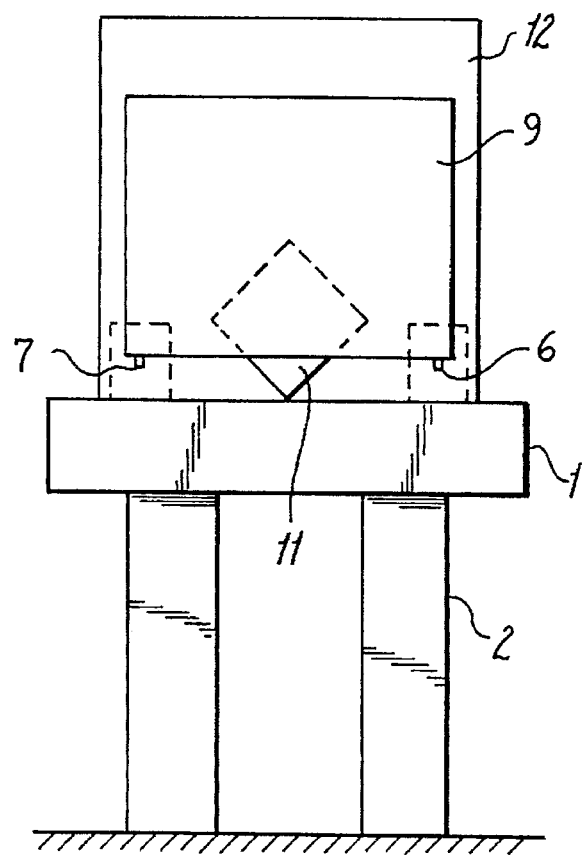
FIG. 3 shows the optical cavity of the same device in a front view.

FIGS. 1 to 3 show three orthogonal views of the device according to the invention. It has been conceived in order to detect gravitational waves and with this aim it has been mounted onto an optical table 1, the legs 2 and 3 of which are supplied with attenuation means (not shown) for ground vibrations in order to isolate the table from vibrations coming from the earth. Such means are well known for optical tables and need not be described in detail.

The table 1 is made of steel and has a weight without feet of for example 360 kg.

Two socles 4 and 5 are disposed on this table which adhere to the table by magnetic forces and which are conventional in the field of optical laboratory tests. Each of these socles presents a support rod 6 and 7 which extends parallelly to the surface of the table and which supports an optical cavity 8.

Figure 4:
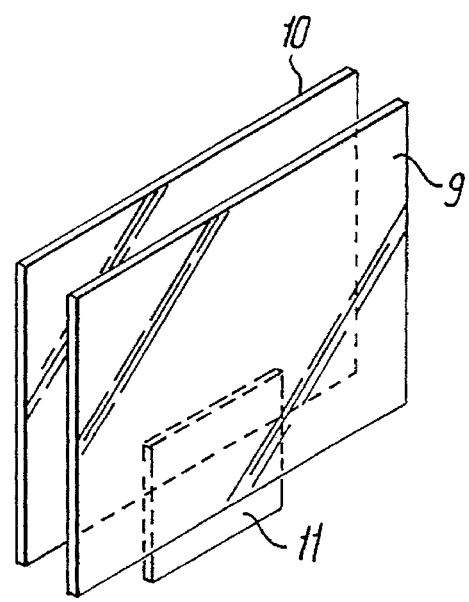
FIG. 4 shows an exploded view of the optical cavity which is part of the device according to the invention.

This optical cavity is represented in more detail in FIG. 4 and comprises two glass substrates 9 and 10, which confine between them a glass plate 11. The dimensions of the substrates are for example 30 to 40 cm, whereas the glass plate 11 is a square plate of 10 cm length and 1 mm thickness. Each substrate carries on one surface (outside or inside) a photographic emulsion on which an interferometric network has been registered beforehand. Such networks are known and are realised by illuminating the emulsion by two spherical waves coming from a source of coherent light.

The glass plate 11, the major part of which is confined between the substrates 9 and 10, extends by one end beyond the bearing of these two plates and rests by this end on the table 1. This end can be either the edge on one side of the plate such as shown in FIG. 4, or the corner between two edges of the plate such as shown in FIG. 3.

In the drawings 1 to 3, the components of the optical cavity 8 have been represented with a distance between them for better distinguishing these different components, but of course, such a distance does not exist in reality.

In fact, the two substrates and the glass plate have plane main surfaces and once they are assembled, they keep together by the impossibility of air to penetrate into the space between the plate and the substrates. The optical cavity rests on the support rods 6 and 7 by simple gravity and it is maintained in the vertical position on the table (which is horizontal) by a back plate 12 made of metal and fixed by the magnetic forces mentioned above to the socles 4 and 5.

This optical cavity 8 can be considered as a detector of micro-movements of the table 1, because the glass plate defines between itself and the two substrates 9 and 10 thin air layers which are modified by the vibrations of the table 1. By illuminating the optical cavity with coherent light coming from a laser 13, interference fringes are observed on a display screen 14, which begin to move in correlation with that of said vibrations. As the case may be, this display screen can be replaced by a photodetector system followed by an automatic image processing in order to define the correlation of the movements in the image.

Due to the great sensitiveness of the device described above, it is necessary to take some precautions during the tests. Thus, the tests have to be controlled and supervised from a great distance in order to avoid that the movements caused by the staff or the exploitation team falsify the results. Despite these precautions and a very elaborate suspension of the table permitting to isolate the table from ground vibrations, it is necessary to carry out the tests at night and in a rural zone in order to eliminate background noise as far as possible. Furthermore, the influence of atmospherical conditions (air pressure, temperature) has to be studied in detail, because these conditions can have an influence on the operation of the attenuators of the table, which are pneumatic attenuators.

After these preliminary remarks, some tests showing the operation of the device will now be described.

First experiment (gravitational)

A non-metallic mass (in order to eliminate the magnetic effects with the surface of the table) is suspended above the table. The interference fringes observed on the screen 14 then undergo a notable displacement with respect to the case when there is no such mass. When disposing said mass below the table, a similar displacement of the fringes can be observed, but in the opposite direction. The gravitational force between two masses (the second mass is the table) being attractive, the effects of the non magnetic mass on the table must in fact be of opposite sign, whether the mass is disposed above the table or below the table.

Second experiment (gravitational)

A person is slowly put into rotation at a distance of 35 m of the detector outside the laboratory. The fringes observed on the display screen 14 (and transmitted by a television camera towards a distant observation station) then move in one direction. When the direction of rotation is changed, a great perturbation of the fringes is observed at the instant of the inversion of movement, and then the fringes move in the other direction with respect to the preceding case.

Third experiment (seismic)

When the attenuation means of the table are disabled, the movement of the earth can be transmitted to the table and thus seismic movements can be detected, provided that the experiments are carried out in a region where the background noise is not predominant.

A theoretical estimation of the micro-movements the device according to the invention is capable of registering leads to minimum detected amplitudes which are $10^{-20}$ m (the radius of the electron being of the order of $10^{-15}$ m!). This amplitude could be even smaller by improving the legs of the table, since the table, although it possesses some degrees of freedom of movement, cannot be considered as completely free. Furthermore, an increase of the size of the optical cavity 8 and those of the table might still improve the limit of sensitiveness of the device.

With respect to this sensitiveness, the problem of the background noise requires an intelligent processing of the images detected on the display screen in order to extract useful signals from the noise. This image processing is carried out in computers and is based on a correlation of the different images. This correlation can be improved by comparing in a training phase the movements of the fringes with the movements of the source which has provoked these micro-movements.

Besides the applications aimed at in the above described experiments, the device according to the invention could be used as a passive radar. The high sensitiveness of the device with respect to gravitational interactions might in fact serve for the detection of masses in movement, like for example airplanes. Such a radar is purely passive, since it does not use an interrogation signal.

The invention is not limited to the device represented in the drawings, device which is a laboratory unit, and any modification implying an industrial application of the device is included in the range of the invention such as claimed.

What is claimed is:

1. An ultra-sensitive interferometer for detecting micro-vibrations in a body comprising:

(a) an assembly of two three-dimensional interferometric networks and a glass plate positioned between the two networks and protruding therefrom, a thin layer of air being entrapped at the interfaces between the glass plate and said networks, the region of overlap between the two networks and the glass plate defining an optical cavity, the portion of said glass plate protruding from the optical cavity contacting said body and the two interferometric networks resting by gravity on supports integral with said body;

(b) a coherent light source illuminating the optical cavity through one of the two interferometric networks so that interference patterns will be generated by the effect of vibrations in said body on the entrapped layers of air; and (c) a device to display the interference patterns contained within the coherent light reflected from the optical cavity.

2. An interferometer according to claim 1 wherein the device to display the interference patterns is associated with an image processing system.

3. A device according to claim 1 for detecting the gravitational micro-vibrations of a body, said body comprising a table which rests on an attenuation system, thereby isolating the table from ground vibrations.

4. A device according to claim 1, wherein the interferometric networks are each registered in a glass substrate of dimensions which are notably larger than those of said plate and wherein the assembly including the optical cavity rests vertically by gravity on two support rods which are positioned beyond said region of overlap.

5. A device according to claim 4 wherein the side of the optical cavity distant from the coherent light source is attached to a metal back plate.

* * * * *